United States Patent [19]

Inoue et al.

[11] Patent Number: 5,179,148

[45] Date of Patent: Jan. 12, 1993

[54] SILICONE RUBBER COMPOSITION AND METHOD FOR THE PREPARATION THEREOF

[75] Inventors: Yoshio Inoue; Masachika Yoshino; Masaharu Takahashi, all of Gunma, Japan

[73] Assignee: Shin-Etsu Chemical Company Limited, Tokyo, Japan

[21] Appl. No.: 698,025

[22] Filed: May 10, 1991

[30] Foreign Application Priority Data

May 14, 1990 [JP] Japan ................................ 2-123862

[51] Int. Cl.$^5$ .............................................. C08K 5/24
[52] U.S. Cl. ..................................... 524/265; 524/861; 528/15; 528/24
[58] Field of Search .................... 528/15, 24; 524/265, 524/861

[56] References Cited

U.S. PATENT DOCUMENTS

| 4,492,786 | 1/1985 | Evans et al. | 528/24 |
|---|---|---|---|
| 4,535,123 | 8/1985 | Sasaski et asl. | 528/15 |
| 4,983,642 | 1/1991 | Nakano et al. | 528/24 |
| 5,002,807 | 3/1991 | Fujimura et al. | 528/24 |

*Primary Examiner*—Melvyn I. Marquis
*Attorney, Agent, or Firm*—Millen, White, Zelano and Branigan

[57] ABSTRACT

A silicone rubber composition having excellent workability and extrusion-moldability and capable of giving cured silicone rubber articles having good mechanical properties is proposed, which is prepared by admixing, in addition to the conventional ingredients of an organopolysiloxane gum, a finely divided reinforcing silica filler and a curing agent such as an organic peroxide, a low molecular-weight organopolysiloxane having, in a molecule, at least three silanolic hydroxy groups which serves as a wetting agent of the silica filler so as to improve the compatibility of the silica filler with the organopolysiloxane gum giving a possibility of increasing the amount of the silica filler without adverse influences such as a decrease in the plasticity of the composition.

14 Claims, No Drawings

SILICONE RUBBER COMPOSITION AND METHOD FOR THE PREPARATION THEREOF

BACKGROUND OF THE INVENTION

The present invention relates to a silicone rubber composition or, more particularly, to a silicone rubber composition having excellent workability in processing and moldability by extrusion so as to be useful as a material of rubber rollers and the like as well as to a method for the preparation of such a silicone rubber composition.

Silicone rubbers are widely used in various fields of industrial applications as a material of electric and electronic parts, buildings, automobile parts, instruments for office automation and the like by virtue of the excellent characteristics of the shaped and cured silicone rubber articles such as heat resistance, cold resistance, weatherability, durability, mold-releasability, electric properties and so on. One of the most rapidly growing application fields of silicone rubbers in recent years is as a material used in office-automation instruments such as rubber rollers in electrophotographic copying machines, printers in word processors and the like along with the remarkable progress of office automation so that consumption of silicone rubbers as a material of rubber rollers is expanding at a great rate year by year. As is well known, the basic ingredients in silicone rubber compositions are an organopolysiloxane having gum-like consistency and a finely divided silica filler for reinforcement while the mechanical properties of cured silicone rubber articles can be improved by increasing the amount of the reinforcing silica filler compounded with the organopolysiloxane gum.

However, it is generally a difficult matter to prepare a silicone rubber composition compounded with a reinforcing silica filler in an amount as large as desirable due to the limited compatibility between the silica filler and the organopolysiloxane gum. Accordingly, an established practice therefor is that a silicone rubber composition is admixed with a so-called wetting agent or compatibility improver for the reinforcing silica filler, which is typically a low molecular weight organopolysiloxane having silanolic hydroxy groups at the molecular chain ends, diphenylsilane diol, alkoxysilanes and the like, in order that an increased amount of the reinforcing silica filler can be compounded with the organopolysiloxane gum. Needless to say, the amount of the wetting agent must be increased more and more when the amount of the reinforcing silica filler to be compounded with the organopolysiloxane gum is desired to be larger and larger. A disadvantage is unavoidable, however, when the amount of the wetting agent is increased that the silicone rubber composition is imparted with a decreased plasticity to exhibit stickiness on the surface resulting in poor workability of the composition in roll-milling or extrusion molding not to be suitable as a material of silicone rubber rollers.

SUMMARY OF THE INVENTION

The present invention accordingly has an object to provide a novel and improved silicone rubber composition free from the above described problems and disadvantages in the prior art compositions to be particularly suitable as a material of silicone rubber rollers as well as to provide a method for the preparation of such a silicone rubber composition.

Thus, the silicone rubber composition of the present invention comprises, as a blend:

(a) 100 parts by weight of an organopolysiloxane represented by the average unit formula

$$R_a SiO_{(4-a)/2}. \qquad (I)$$

in which R is an unsubstituted or substituted monovalent hydrocarbon group and the subscript $a$ is a positive number in the range from 1.95 to 2.05, having an average degree of polymerization of at least 3000;

(b) from 0.1 to 20 parts by weight of a silanolic hydroxy group-containing organopolysiloxane represented by the average unit formula

$$R^1_m(OH)_n SiO_{(4-m-n)/2}. \qquad (II)$$

in which $R^1$ is an unsubstituted or substituted monovalent hydrocarbon group, the subscript m is a positive number in the range from 1 to 2 and the subscript n is a positive number not exceeding 1 with the proviso that m+n is larger than 1 but not exceeding 3, having at least three silanolic hydroxy groups in a molecule;

(c) from 5 to 50 parts by weight of a finely divided silica filler having a specific surface area of at least 50 m²/g; and (d) a curing agent in an amount sufficient to cure the composition.

The above defined silicone rubber composition can be prepared by uniformly blending the above described components (a), (b) and (c) to give a uniform mixture which is then subjected to a heat treatment at a temperature in the range from 100° to 200° C. for a length of time from 30 minutes to 24 hours followed by admixture of the component (d) after cooling.

DETAILED DESCRIPTION OF THE PREFERRED EMBODIMENTS

As is described above, the essential ingredients in the inventive silicone rubber composition are the components (a), (b), (c) and (d), of which the components (a), (c) and (d) are rather conventional and the most characteristic ingredient is the component (b) which serves as a wetting agent of the silica filler and imparts the composition with good workability in roll-milling and extrusion molding without decreasing the plasticity. It is a commercially advantageous way that a compound consisting of the components (a), (b) and (c) is supplied to the user of the silicone rubber composition and the component (d) is compounded with the compound by the user to prepare the final curable silicone rubber composition.

In the average unit formula (I) representing the organopolysiloxane as the component (a), the symbol R denotes an unsubstituted or substituted monovalent hydrocarbon group having 1 to 10 or, preferably, 1 to 8 carbon atoms exemplified by alkyl groups such as methyl, ethyl, propyl, butyl and octyl groups, alkenyl groups such as vinyl and allyl groups, aryl groups such as phenyl and tolyl groups and aralkyl groups such as 2-phenylethyl groups as well as those substituted hydrocarbon groups such as chloromethyl, 3,3,3-trifluoropropyl and 2-cyanoethyl groups obtained by replacing a part or all of the hydrogen atoms in the above named hydrocarbon groups with halogen atoms, cyano groups and the like. Although two kinds or more of these groups can be contained in a molecule of the organopolysiloxane, it is preferable that at least 50% by moles of the groups denoted by R are methyl groups and from 0.001 to 1.0% by moles or, preferably, from 0.01 to 0.5% by moles of the groups denoted by R are alkenyl groups such as vinyl and allyl groups or, in particular, vinyl groups. The organopolysiloxane as the component (a) usually contains no or not more than two silanolic hydroxy groups in a molecule. It is further desirable that, when the silicone rubber article obtained by curing the inventive composition is desired to have good cold resistance, resistance against high-energy radiation and transparency, a substantial proportion but 20% by moles or less of the groups denoted by R are phenyl groups. Incorporation of 2-cyanoethyl groups or 3,3,3-trifluoropropyl groups into the organopolysiloxane has an effect to impart the silicone rubber with improved resistance against oils and gasoline.

The subscript a in the average unit formula (I) is a positive number in the range from 1.95 to 2.05. This means that the molecule of the organopolysiloxane has a substantially linear molecular structure solely or mostly composed of diorganosiloxane units although small amounts of mono-, tri- and tetrafunctional siloxane units have no particularly adverse influences. The terminal groups blocking the molecular chain ends are not particularly limitative including triorganosiloxy groups and silanolic hydroxy groups. The organopolysiloxane should have an average molecular weight of at least 3000 and a gum-like consistency in order that the cured silicone rubber obtained from the composition may have good mechanical properties or, preferably, an average degree of polymerization in the range from 5000 to 10000 in respect of the good balance between the workability of the composition and mechanical properties of the cured silicone rubber.

The component (b) in the inventive silicone rubber composition is an organopolysiloxane having at least three silanolic hydroxy groups in a molecule and serves as a wetting agent for the component (c). In the average unit formula (II) representing the organopolysiloxane as the component (b), the symbol $R^1$ denotes an unsubstituted or substituted monovalent hydrocarbon group exemplified by those groups given as the examples of the group denoted by R in the organopolysiloxane as the component (a). The subscript m in the formula is a positive number in the range from 1 to 2 and n is a positive number not exceeding 1 with the proviso that m+n is larger than 1 but not exceeding 3. It is preferable that n is in the range from 0.03 to 0.8 and m+n is in the range from 1.8 to 2.7. It is essential that the organopolysiloxane as the component (b) has at least three silanolic hydroxy groups in a molecule. The average degree of polymerization of this organopolysiloxane should not exceed 100 or preferably should be in the range from 10 to 50 in order that the effect thereof as a wetting agent for the finely divided silica filler can be fully exhibited.

Examples of the silanol-containing organopolysiloxane as the component (b) include those expressed by the following structural formulas, in which Me denotes a methyl group:

Me$_3$Si—O—(—SiMe$_2$—O—)$_2$.
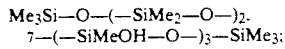—(—SiMeOH—O—)$_3$—SiMe$_3$;

Me$_3$Si—O—(—SiMe$_2$—O—)$_1$.
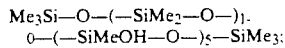—(—SiMeOH—O—)$_5$—SiMe$_3$;

Me$_3$Si—O—(—SiMe$_2$—O—)$_1$.
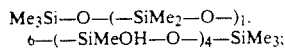—(—SiMeOH—O—)$_4$—SiMe$_3$;

Me$_3$Si—O—(—SiMe$_2$—O—)$_5$.
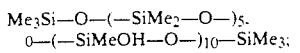—(—SiMeOH—O—)$_{10}$—SiMe$_3$;

Me$_3$Si—O—(—SiMe$_2$—O—)$_7$.
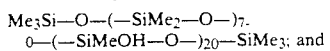—(—SiMeOH—O—)$_{20}$—SiMe$_3$; and

HO—SiMe$_2$—O—(—SiMe$_2$—O—)$_1$.
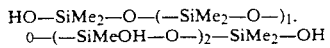—(—SiMeOH—O—)$_2$—SiMe$_2$—OH as well as a cyclic tetramer of 1,1,3,5,7-pentamethyl-3,5,7-trihydroxy cyclotetrasiloxane and the like, though not particularly limitative thereto.

The silanol-containing organopolysiloxane as the component (b) in the inventive silicone rubber composition can be prepared by the dehydrogenation condensation reaction of an organohydrogenpolysiloxane represented by the average unit formula $R^1_m H_n SiO_{(4-m-n)/2}$, in which each symbol has the same meaning as defined for the formula (II), having at least three silicon-bonded hydrogen atoms in a molecule with water so as to convert the ≡SiH groups into ≡SiOH groups. Namely, the organohydrogenpolysiloxane is dissolved in a water-containing organic solvent such as acetone, 1,4-dioxane, tetrahydrofuran and the like and the solution is heated in the presence of a catalytic amount of a platinum compound as a catalyst so that the dehydrogenation reaction readily proceeds.

The amount of the silanol-containing organopolysiloxane as the component (b) in the inventive composition is in the range from 0.1 to 20 parts by weight or, preferably, from 1.0 to 10 parts by weight per 100 parts by weight of the organopolysiloxane as the component (a). When the amount thereof is too small, the desired wetting effect cannot be fully exhibited so that difficulties are encountered in compounding a large amount of the finely divided silica filler as the component (c) with the organopolysiloxane as the component (a). When the amount thereof is too large, on the other hand, adverse influences are caused on the physical properties of the silicone rubber obtained by curing the silicone rubber composition.

The component (c) in the inventive silicone rubber composition is a finely divided silica filler which serves as a reinforcing agent of the silicone rubber to improve the mechanical properties such as hardness, tensile strength and the like of the cured silicone rubber. Various grades of finely divided silica fillers are available as a commercial product including so-called fumed and precipitated silica fillers, optionally, after a treatment of the surface with a linear organopolysiloxane, cyclic organopolysiloxane oligomer, hexamethyl disilazane, methyl chlorosilanes and the like. These silica fillers can be used either singly or as a combination of two kinds or more according to need. The finely divided silica filler should have a specific surface area of at least 50 m$^2$/g or, preferably, from 100 to 400 m$^2$/g in order to fully exhibit the reinforcing effect.

The amount of the finely divided silica filler as the component (c) in the inventive silicone rubber composition is in the range form 5 to 50 parts by weight per 100 parts by weight of the organopolysiloxane as the component (a). When the amount of the filler is too small, the desired reinforcing effect to be obtained thereby cannot be fully exhibited as a matter of course. On the other hand, it is very difficult to compound the filler in an amount to exceed the above mentioned upper limit and, if a uniform composition could ever be obtained, the workability of the composition is poor and the cured silicone rubber obtained from the composition would have rather poor mechanical properties.

The first step for the preparation of the silicone rubber composition of the present invention is blending of the above described components (a), (b) and (c) each in a specified amount into a uniform compound. It is optional according to need that the compound is further admixed with various kinds of known additives conventionally used in silicone rubber compositions including non-reinforcing fillers such as quartz powder, diatomaceous earth, iron oxide, zinc oxide, titanium dioxide, carbon black, barium oxide, magnesium oxide, ceric hydroxide, calcium carbonate, magnesium carbonate, zinc carbonate, asbestos, glass wool, fine mica flakes, powder of fused silica glass and the like, coloring agents, i.e. pigments and dyes, aging retarders, antioxidants, antistatic agents, flame retardants such as antimony oxide, chlorinated paraffins and the like, thermal-conductivity improvers such as boron nitride, aluminum oxide and the like, mold-release agents such as metal salts of higher fatty acid and the like and so on each in a limited amount.

The mixture of the essential components (a), (b) and (c) with admixture of the optional additives mentioned above is prepared in a blending machine such as kneaders and preferably then subjected to a heat treatment at a temperature of 100° to 200° C. for 30 minutes to 24 hours or, more preferably, from 1 to 5 hours. This heat treatment can conveniently be undertaken in a blending machine equipped with a heating means such as kneaders, into which the components (a), (b) and (c) are introduced and blended together at an elevated temperature followed by keeping therein for a specified length of time. By undertaking this heat treatment, the inventive silicone rubber composition can be imparted with further improved workability in extrusion molding.

In order to impart the compound of the components (a), (b) and (c) described above with curability, the compound must be admixed with a curing agent as the component (d). Various classes of curing agents are known in the prior art and can be used here without particular limitations. A class of the curing agent includes organic peroxides such as benzoyl peroxide, 2,4-dichlorobenzoyl peroxide, di-tert-butyl peroxide, 2.5-dimethyl di-tert-butyl peroxide, tert-butyl perbenzoate, tert-butylperoxy propyl carbonate, dicumyl peroxide and the like. These organic peroxides can be used either singly or as a combination of two kinds or more according to need. The amount of the organic peroxide added to the inventive composition as a curing agent is usually in the range from 0.1 to 5 parts by weight per 100 parts by weight of the organopolysiloxane as the component (a).

When the organopolysiloxane as the component (a) has at least two alkenyl, e.g., vinyl, groups in a molecule, the curing agent as the component (d) can be a combination of an organohydrogenpolysiloxane and a catalytic amount of a platinum compound. Namely, curing of the inventive silicone rubber composition can be effected by the addition reaction or so-called hydrosilation reaction between the alkenyl-containing organopolysiloxane as the component (a) and an organohydrogenpolysiloxane having, in a molecule, at least two or, preferably, three hydrogen atoms directly bonded to the silicon atoms as a crosslinking agent. The organohydrogenpolysiloxane is represented by the average unit formula $R^2_b H_c Si_{(4-b-c)/2}$, in which $R^2$ is a monovalent hydrocarbon group other than alkenyl and the subscripts b and c are each a positive number with the provide that $b+c$ is smaller than 4, and should desirably have a degree of polymerization not exceeding 300. The amount of the organohydrogenpolysiloxane added to the composition as the crosslinking agent should be sufficient to provide from 0.5 to 10 moles or, preferably, from 1 to 5 moles of the silicon-bonded hydrogen atoms per mole of the alkenyl groups in the organopolysiloxane as the component (a).

The above mentioned addition reaction or hydrosilation reaction can be promoted by a catalytic amount of a platinum metal in a finely divided form or a platinum compound exemplified by the platinum black disclosed in U.S. Pat. No. 2,823,218, platinum-hydrocarbon complex compounds disclosed in U.S. Pat. Nos. 3,159,601 and 3,159,662, chloroplatinic acid-olefin complex compounds disclosed in U.S. Pat. No. 3,516,946, platinum-vinylsiloxane complex compounds disclosed in U.S. Pat. Nos. 3,775,452 and 3,814,780 and the like. The amount of the platinum catalyst added to the inventive composition is usually in the range from 0.1 to 1000 ppm by weight or, preferably, from 1 to 100 ppm by weight calculated as platinum based on the total amount of the alkenyl group-containing organopolysiloxane as the component (a) and the organohydrogenpolysiloxane as the crosslinking agent.

When the inventive silicone rubber composition is of the type curable by the above mentioned addition reaction between the alkenyl group-containing organopolysiloxane and organohydrogenpolysiloxane, the storage stability of the composition at room temperature can be improved or the composition is imparted with an adequate pot life by the admixture of a reaction moderator such as a methyl vinyl cyclotetrasiloxane, acetylene alcohol and the like. The addition reaction-curable silicone rubber composition of the present invention can be cured by heating, for example, for 1 minute to 5 hours at a temperature in the range from 60° to 400° C.

The silicone rubber composition of the present invention prepared in the above described manner has a high Williams plasticity and is suitable as a material for extrusion molding. The silicone rubber article manufactured by extrusion molding of the inventive silicone rubber composition followed by curing are useful in various applications as a material of gaskets for buildings, rubber rollers in facsimile machines, tubes for medical treatments, rubber contacts, nipples of nursing bottles, constant-velocity joint boots in automobiles, plug boots, anode caps, insulation of electric wires and the like.

In the following, the silicone rubber composition of the present invention is described in more detail by way of examples and comparative examples, in which the term of "parts" always refers to "parts by weight".

EXAMPLES 1 TO 3 AND COMPARATIVE EXAMPLES 1 AND 2

A base compound, referred to as the Compound I hereinbelow, was prepared by blending and kneading, in a kneader, 100 parts of a diorganopolysiloxane gum, referred to as the Gum I hereinbelow, having an average degree of polymerization of about 8000 and consisting of 99.825% by moles of dimethyl siloxane units, 0.15% by moles of methyl vinyl siloxane units and 0.025% by moles of dimethyl vinyl siloxy units with 2 parts of an organohydroxy polysiloxane expressed by the structural formula Me₃Si—O—(—SiMe₂—O—)₁.
₀—(—SiMeOH—O—)₅—SiMe₃.

in which Me is a methyl group, and 20 parts of a fumed silica filler having a specific surface area of about 200 m²/g (Aerosil 200, a product by Nippon Aerosil Co.) followed by a heat treatment at 150° C. for 2 hours.

Another base compound, referred to as the Compound II hereinbelow, was prepared by blending and kneading, in a kneader, 30 parts of the Gum I, 70 parts of a dimethyl polysiloxane gum, referred to as the Gum II hereinbelow, having an average degree of polymerization of about 8000 and terminated at each molecular chain end with a dimethyl vinyl siloxy group, 2 parts of the same organohydroxy polysiloxane as used above and 20 parts of the same fumed silica filler as used above followed by a heat treatment at 150° C. for 2 hours.

Further, a third base compound, referred to as the Compound III hereinbelow, was prepared by blending and kneading, in a kneader, 100 parts of the Gum I, 2 parts of an organohydroxy polysiloxane expressed by the average formula HO—SiMe₂—O—(—SiMe₂—O—)₁.
₀—(—SiMeOH—O—)₄—SiMe₂—OH and 20 parts of the same fumed silica filler as used above followed by a heat treatment at 150° C. for 2 hours.

For comparison, a fourth base compound, referred to as the Compound IV hereinbelow, was prepared by blending and kneading, in a kneader, 100 parts of the Gum I with 4 parts of a dimethyl polysiloxane having a degree of polymerization of 10 and terminated at each molecular chain end with a silanolic hydroxy group and 20 parts of the same fumed silica filler as used above followed by a heat treatment at 150° C. for 2 hours.

For further comparison, a fifth base compound, referred to as the Compound V hereinbelow, was prepared by blending and kneading, in a kneader, 30 parts of the Gum I, 70 parts of the Gum II, 2 parts of a dimethylpolysiloxane having an average degree of polymerization of 6 and terminated at each molecular chain end with a silanolic hydroxy group and 20 parts of the same fumed silica filler as used above followed by a heat treatment at 150° C. for 2 hours.

Each of the above prepared Compounds I to V was then subjected to the determination of the Williams plasticity according to the procedure specified in JIS C 2137 by remilling and bringing, after 10 minutes, under a load to measure the height thereof after 3 minutes by using a dial gauge as a measure of the plasticity. The values were 230, 220, 250, 110 and 140 for the Compounds I, II, III, IV and V, respectively.

Each a 100 parts portion of the Compounds I, III and IV was admixed with 0.25 part of a methyl hydrogen polysiloxane expressed by the formula Me₃Si—O—(—SiHMe—O—)₄—(—SiMe₂—O—)₆—SiMe₃ and 0.03 part of an octyl alcohol solution of chloroplatinic acid in a concentration of 1% by weight as platinum and compression-molded at 170° C. for 10 minutes followed by post-curing at 200° C. for 4 hours to give a cured silicone rubber sheet of which mechanical properties were determined to give the results shown in Table 1.

Separately, each a 100 parts portion of the Compounds II and V was admixed with 0.6 part of 2,4-dichlorobenzoyl peroxide and compression-molded at 120° C. for 10 minutes followed by post-curing at 200° C. for 4 hours to give a cured silicone rubber sheet of which mechanical properties were determined to give the results also shown in Table 1.

Each of the Compounds I to V after admixture of the curing agent, i.e. a combination of the methyl hydrogen polysiloxane and chloroplatinic acid or 2,4-dichlorobenzoyl peroxide, as mentioned above was introduced into an extruder machine with a cylinder barrel of 40 mm diameter and an L/D of 12 equipped with a die of 10 mm diameter and extruded therefrom at 15° to 30° C. continuously at a rate of 1 meter/minute into a continuous-length rod-like body of 8 mm diameter which was passed through a hot-air circulation oven of 2 meter long at 300° C. to give a cured silicone rubber rod. The results were that the rods of the Compounds I, II and III could retain the rod-like form throughout the extrusion and curing procedures while no rod-like cured silicone rubber body could be obtained from the Compounds IV and V.

TABLE 1

| | Compound No. | | | | |
|---|---|---|---|---|---|
| | I | II | III | IV | V |
| Type of curing reaction | Addition | Peroxide | Addition | Addition | Peroxide |
| Harness, JIS A | 32 | 30 | 35 | 33 | 32 |
| Ultimate elongation % | 400 | 800 | 370 | 390 | 750 |
| Tensil strength, kgf/cm² | 60 | 70 | 55 | 55 | 65 |

What is claimed is:

1. A silicone rubber composition which comprises, as a blend:
   (a) 100 parts by weight of an organopolysiloxane represented by the average unit formula $R_aSiO_{(4-a)/2}$, in which R is an unsubstituted or substituted monovalent hydrocarbon group and the subscript a is a positive number in the range from 1.95 to 2.05, having an average degree of polymerization of at least 3000;
   (b) from 0.1 to 20 parts by weight of an organopolysiloxane having at least three silanolic hydroxy groups per molecule, said organopolysiloxane represented by the average unit formula $R^1_m(OH)_nSiO_{(4-m-n)/2}$, in which $R^1$ is an unsubstituted or substituted monovalent hydrocarbon group, the subscript m is a positive number in the range from 1 to 2 and the subscript n is a positive number not exceeding 1 with the proviso that m+n is larger than 1 but not exceeding 3;
   (c) from 5 to 50 parts by weight of a finely divided silica filler having a specific surface area of at least 50 m²/g; and
   (d) a curing agent in an amount sufficient to cure the composition.

2. The silicone rubber composition as claimed in claim 1 in which from 0.001 to 1.0% by moles of the groups denoted by R in the organopolysiloxane as the component (a) are alkenyl groups, the balance being methyl groups.

3. The silicone rubber composition as claimed in claim 1 in which the organopolysiloxane as the component (a) has an average degree of polymerization in the range from 5000 to 10000.

4. The silicone rubber composition as claimed in claim 1 in which the subscript n in the average unit formula representing the component (b) is a positive number in the range from 0.03 to 0.8 with the proviso that m+n is in the range from 1.8 to 2.7.

5. The silicone rubber composition as claimed in claim 1 in which the silanolic hydroxy group-containing organopolysiloxane as the component (b) has an average degree of polymerization not exceeding 100.

6. The silicone rubber composition as claimed in claim 1 in which the amount of the silanolic hydroxy group-containing organopolysiloxane as the component (b) is in the range from 0.1 to 10 parts by weight per 100 parts by weight of the component (a).

7. The silicone rubber composition as claimed in claim 1 in which the curing agent as the component (d) is an organic peroxide.

8. The silicone rubber composition as claimed in claim 7 in which the amount of the organic peroxide as the component (d) is in the range from 0.1 to 5 parts by weight per 100 parts by weight of the component (a).

9. The silicone rubber composition as claimed in claim 1 in which the organopolysiloxane as the component (a) has at least two alkenyl groups in a molecule and the curing agent as the component (d) is a combination of an organohydrogenpolysiloxane having, in a molecule, at least two hydrogen atoms directly bonded to the silicon atoms and a platinum compound.

10. The silicone rubber composition as claimed in claim 9 in which the amount of the organohydrogenpolysiloxane is sufficient to provide from 0.5 to 10 moles of the silicon-bonded hydrogen atoms per mole of the alkenyl groups in the component (a).

11. The silicone rubber composition as claimed in claim 9 in which the amount of the platinum compound is in the range from 0.1 to 1000 ppm by weight calculated as platinum based on the total amount of the organopolysiloxane as the component (a) and the organohydrogenpolysiloxane.

12. A method for the preparation of a silicone rubber composition according to claim 1 which comprises the steps of:

13. A silicone rubber composition according to claim 1 wherein component (b) is selected from the group consisting of:

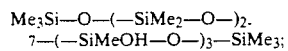

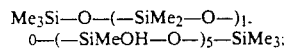

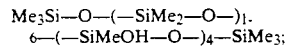

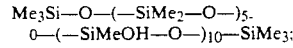

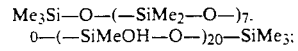

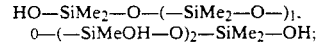

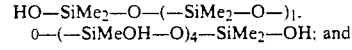

a cyclic tetramer of 1,1,3,5,7,-pentamethyl-3,5,7-trihydroxy cyclotetrasiloxane.

14. A silicone rubber composition according to claim 1 wherein component (b)

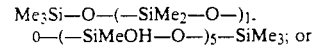

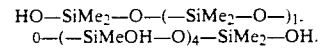

* * * * *